United States Patent
Crawford et al.

(10) Patent No.: US 9,628,267 B2
(45) Date of Patent: Apr. 18, 2017

(54) INDUSTRIAL CONTROL SYSTEM WITH INTERNAL GENERATION FOR SECURE NETWORK COMMUNICATIONS

(75) Inventors: John W. Crawford, Cumming, GA (US); Harry A. Brian, Jr., Johnson City, TN (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 91 days.

(21) Appl. No.: 14/427,796

(22) PCT Filed: Sep. 13, 2012

(86) PCT No.: PCT/US2012/055095
§ 371 (c)(1),
(2), (4) Date: Mar. 12, 2015

(87) PCT Pub. No.: WO2014/042638
PCT Pub. Date: Mar. 20, 2014

(65) Prior Publication Data
US 2015/0280910 A1    Oct. 1, 2015

(51) Int. Cl.
*H04L 29/06* (2006.01)
*H04L 9/08* (2006.01)

(52) U.S. Cl.
CPC ............ *H04L 9/0819* (2013.01); *H04L 63/06* (2013.01); *H04L 63/061* (2013.01)

(58) Field of Classification Search
None
See application file for complete search history.

(56) References Cited

U.S. PATENT DOCUMENTS

| | | | | |
|---|---|---|---|---|
| 7,536,548 B1* | 5/2009 | Batke | ............... | H04L 63/061 713/166 |
| 7,643,817 B2* | 1/2010 | Klug | ............... | H04L 63/0442 455/411 |
| 7,747,021 B2* | 6/2010 | Lindteigen | ....... | H04L 29/06027 380/270 |
| 8,280,057 B2* | 10/2012 | Budampati | ......... | H04L 63/0464 380/270 |
| 8,874,951 B1* | 10/2014 | Chuang | ............ | G06F 17/30206 709/204 |

(Continued)

FOREIGN PATENT DOCUMENTS

DE    102008038913 A1    2/2010

OTHER PUBLICATIONS

PCT International Search Report mailed Jun. 6, 2013 corresponding to PCT International Application No. PCT/US2012/055095 filed Sep. 13, 2012 (11 pages).

*Primary Examiner* — Malcolm Cribbs (57) ABSTRACT

Security for network communications is internally generated by an industrial control system (ICS). The ICS is assembled in a known-good environment prior to connecting to another network. While in the known-good environment, one or more components of the ICS auto-negotiate (40) with other components, assigning (42) security tokens. These certificates are used to internally secure communications between the components prior to any connection to other devices and without relying on external provisioning of the security tokens during commissioning (30) of the ICS.

18 Claims, 2 Drawing Sheets

(56) References Cited

U.S. PATENT DOCUMENTS

| | | | |
|---|---|---|---|
| 2005/0100166 A1* | 5/2005 | Smetters | H04L 63/0492 380/277 |
| 2005/0188371 A1* | 8/2005 | Bocking | G06F 8/60 717/178 |
| 2006/0282506 A1* | 12/2006 | Furuishi | G05B 19/052 709/208 |
| 2006/0285693 A1* | 12/2006 | Raikar | H04L 63/062 380/278 |
| 2009/0060192 A1* | 3/2009 | Budampati | H04L 63/0464 380/270 |
| 2009/0169006 A1 | 7/2009 | Klein | |
| 2009/0217347 A1* | 8/2009 | Chen | H04L 45/00 726/1 |
| 2009/0222885 A1* | 9/2009 | Batke | H04L 63/061 726/1 |
| 2012/0036568 A1 | 2/2012 | Kodama | |

* cited by examiner

INDUSTRIAL CONTROL SYSTEM WITH INTERNAL GENERATION FOR SECURE NETWORK COMMUNICATIONS

BACKGROUND

The present embodiments relate to communications in an industrial control system (ICS). In particular, secure network communications for an ICS are established.

In a networked ICS environment, each member of the ICS network may need to ensure the authenticity and/or integrity of any received messages. Confidentiality of message contents may also be required. To establish this level of security, public/private key pairs are used, such as using a public-key infrastructure (PKI) system. A third party validation authority binds devices for communication through registration and issuance of certificates. The registration authority ensures that the binding of the certificates to devices is performed. However, this approach often necessitates complex infrastructure and administrative overhead for certificate and key management using third parties.

BRIEF SUMMARY

By way of introduction, the preferred embodiments described below include methods, systems, instructions, and computer readable media for internal generation for secure network communications. The ICS is assembled in a known-good environment prior to connecting to another network. While in the known-good environment, one or more components of the ICS auto-negotiate with other components, assigning security tokens. These certificates are used to internally secure communications between the components prior to any connection to other devices and without relying on external provisioning of the security tokens during commissioning of the ICS.

In a first aspect, a method is provided for internal generation for secure network communications. An industrial control system is commissioned. The industrial control system includes a plurality of networked components in a known-good environment. Encryption keys are exchanged between the networked components in the known-good environment without download of the encryption keys to the commissioned industrial control system. Communications between the networked components are secured with the encryption keys.

In a second aspect, a system is provided for internal generation of secure network communications. An industrial control network includes one or more programmable logic controllers, one or more human machine interface devices, and one or more operator stations. An engineering station is configured to establish peers between one or more programmable logic controllers, one or more human machine interface devices, and one or more operator stations in an industrial control network. The members of the peer groups are configured to assign security tokens to the peers of the peer groups in the industrial control network, to communicate between the peers within peer groups based on the security tokens, and to limit communication outside of the peer groups based on the security tokens.

In a third aspect, a non-transitory computer readable storage medium has stored therein data representing instructions executable by a programmed processor for internal generation of secure network communications. The storage medium includes instructions for providing identification to a first component of an industrial control network, receiving identities of peers and a project, running a key-exchange algorithm without access outside of the industrial control network, assigning security tokens to the peers as an output of the key-exchange algorithm, and communicating pursuant to the project as a function of the security tokens.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

By allowing network devices to maintain and auto-negotiate their own key/certificate store in a distributed manner, secure communications may be provided in ICS. Since the ICS is commissioned in known-good environment, internal auto-negotiation provides security without external verification. This method requires none of the infrastructure and administrative overhead associated with PKI. Therefore, from the user's perspective, the process may be much simpler. The engineer of the ICS may have little or no involvement in establishing the security.

The network is provisioned in a known-good environment, such as in the case of new or newly formed industrial control systems. When commissioning is complete, a command is broadcast on the network to start the auto-negotiation process. Once this process is complete, network messages use cryptographic methods to ensure integrity and authenticity. Confidentiality may also be provided. All of the inter-networked devices then operate with a sufficient (e.g., same) trust level.

Figure 1:
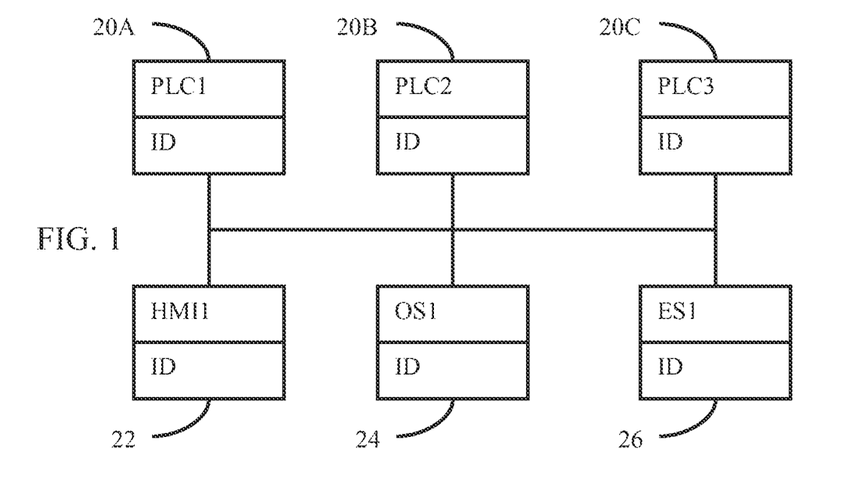
FIG. 1 is a block diagram of one embodiment of a system for internal generation of secure network communications.

FIG. 1 shows a system for internal generation of secure network communications. The system is an industrial control system using an industrial control network. The industrial control network implements industrial processes using field devices. For example, the system may monitor and control a manufacturing process using communications with field devices (e.g., programmable logic controllers or remote terminal units). The system provides control capabilities and a user interface for interacting with the control and data acquisition of the process.

The field devices are panels, programmable logic controllers, and/or remote terminal units. In the example of FIG. 1, three programmable logic controllers 20A-C, a human-machine interface device 22, and an operator station 24 are shown. Additional, different, or fewer field devices may be provided. Other controllers, monitors, or devices for monitoring physical processes or characteristics and/or controlling manufacturing or production may be used.

The human-machine interface device 22 is a panel, personal computer, portable handheld controller, safety switch, user input, display device, and/or other component for human interaction with the system. For example, the human-machine interface device 22 is a button for shutting down operation of a robotic component by an operator (e.g., a safety or emergency trigger). More than one human-machine interface device 22 may be provided.

The operator station 24 is a panel, computer, display, monitor station (e.g., bank of lights with or without associated inputs), and/or other device for monitoring performance of or a part of the industrial control process. For example, the operator station 24 includes one or more status displays indicating the operation of one or more of the programmable logic controllers 20A-C and/or any activation of the human-machine interface device 22. Sensor and/or actuator status may be displayed. More than one operation station 24 may be provided.

The programmable logic controllers 20A-C are panels, computers, processors, circuits, or other programmable devices for automation of electromechanical, chemical, pneumatic, fluid, electrical, mechanical, or other processes. For example, the programmable logic controllers 20A-C control machinery on assembly lines, heating-ventilation-air conditioning (HVAC), refinery flow, mixing, or other devices or processes. The programmable logic controllers 20A-C output in response to input conditions within a limited time.

For operating, the programmable logic controllers 20A-C may include sensors and/or actuators. The sensors may be temperature, pressure, rate, current, voltage, inductance, capacitance, chemical, flow, or other sensors. Any number of sensors may be used. The actuators may be magnetic, electric, pneumatic, or other devices for altering, moving, drilling, welding, mixing, spinning, changing or otherwise actuating. The sensors and actuators communicate with or are part of the field devices for control and measuring.

The programmable logic controllers 20A-C may be configured to operate based on programming. The actions to perform and/or the set points for when to perform the actions may be programmed. The work flow or series of actions may be configured. Based on input at a user interface and/or a project provided over the network, the programmable logic controllers 20A-C are configured to control one or more aspects of the industrial process based on triggers and/or report events associated with the industrial process.

The system of the industrial control network includes one or more controller stations. In the example of FIG. 1, the control is centralized in an engineering station 26. Distributed control of the system may be used. The engineering station 26 is a supervisory control and data acquisition (SCADA) system or other component for configuring, diagnosing, or otherwise arranging for operation of the industrial control network.

Figure 2:
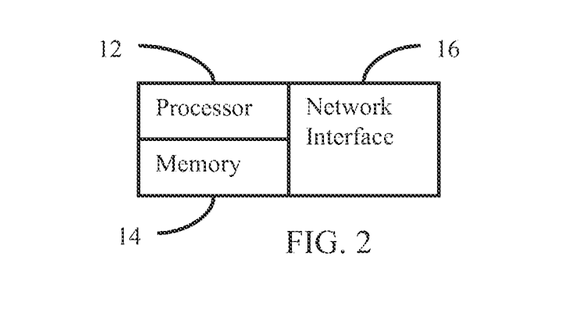
FIG. 2 is a block diagram of one embodiment of a device in an industrial control network of the system of FIG. 1.

FIG. 2 shows one embodiment of one or more of the programmable logic controllers 20A-C, human-machine interface devices 22, operator stations 24, and engineering station 26. Each device is the same or different. For example, the programmable logic controllers 20A-C are purpose built to withstand stresses and forces in the industrial environment and/or are computers. The human-machine interface devices 22 are switches or buttons with communications capabilities, computers, or field panels. The operator stations 24 are field panels or computers. The engineering station 26 is a personal computer with one or more cards for interfacing or communicating with the other components.

The components include a processor 12, memory 14, and network interface 16. These parts provide for securing communications in the ICS. Additional, different, or fewer parts may be provided. For example, a memory 14 or processor 12 are not provided in a human-machine interface 24. As another example, a display is provided for the engineering station 26 and/or operator station 24. Any type of display may be used, such as LEDs, monitor, LCD, projector, plasma display, CRT, or printer.

The processor 12 is a general processor, central processing unit, control processor, graphics processor, digital signal processor, three-dimensional rendering processor, image processor, application specific integrated circuit, field programmable gate array, digital circuit, analog circuit, combinations thereof, or other now known or later developed device for use in the industrial control network. The processor 12 is a single device or multiple devices operating in serial, parallel, or separately. The processor 12 may be a main processor of a computer, such as a laptop or desktop computer, or may be a processor for handling tasks in a purpose-built system, such as in a programmable logic controller 20A-C. The processor 26 is configured by software and/or hardware.

The memory 14 is a graphics processing memory, video random access memory, system memory, random access memory, cache memory, hard drive, optical media, magnetic media, flash drive, buffer, database, combinations thereof, or other now known or later developed memory device for storing data. The memory 14 stores one or more datasets representing sensor readings, set points, and/or actuator status. The memory 14 may store calculated values or other information for reporting or operating in the network. For example, event data is stored.

The memory 14 or other memory is a non-transitory computer readable storage medium storing data representing instructions executable by the programmed processor 12 for internal generation of secure network communications. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The network interface 16 is a physical connector and associated electrical communications circuit for networked communications. The network interface 16 is an Ethernet connector and corresponding circuit. For example, a network card is provided. Alternatively, wireless or other wired connection is provided.

Referring again to FIG. 1, the field devices and engineering station 26 are connected through one or more communications networks. For example, a field network interconnects the field devices. The field network may be wired and/or wireless. Any communications format may be used, such as PROFINET, HTTP, FTP, Ethernet, or Medbus TCP. The field devices communicate to indicate events and to implement control, such as determining the status of operation of one programmable logic controller 20A to control another device with another programmable logic controller 20B.

For establishing secure communications, the engineering station 26 and field devices are configured by software and/or hardware to perform various functions. The engineering station 26 is configured to download operating programs to the field devices and to set peer groups for communications between the field devices. The auto-negotiation may occur without setting peer groups, such as treating the entire network as a peer group. The field devices are configured to auto-negotiate security tokens and communicate using the security established with the security tokens. The auto-negotiation occurs without access outside of the industrial control network. The auto-negotiation may be performed by the engineering station rather than the field devices.

The industrial control network may or may not connect with other networks. When first established or commissioned, the industrial control network is a stand-alone network or not connected to devices networked with other networks. The industrial control network is commissioned in a known-good environment. By avoiding connections to other devices or networks, the various components of the network are free of any software viruses or undesired software being transferred to the industrial control network. A connection with a firewall is not provided, but may be used while maintaining the known-good environment based on firewall settings.

In one embodiment, the components of the industrial control network are new (built new or refurbished from a factory or otherwise certified as clean), so are unpackaged and connected. The components may be powered on prior to or after connection into the industrial control network. Once connected with each other but not with other networks or not with devices used for other purposes than commissioning, the industrial control network is in a known-good environment. The known-good environment may be established for existing industrial control networks in other embodiments, such as by formatting or cleaning the components.

The communications are secured with security tokens in the known-good environment. Establishing communications and assigning of security tokens occurs prior to any connection of the industrial control network to another network or non-commissioning device. The security for limiting communications is automatically negotiated by and between the components of the network without access to remote sources.

Figure 3:
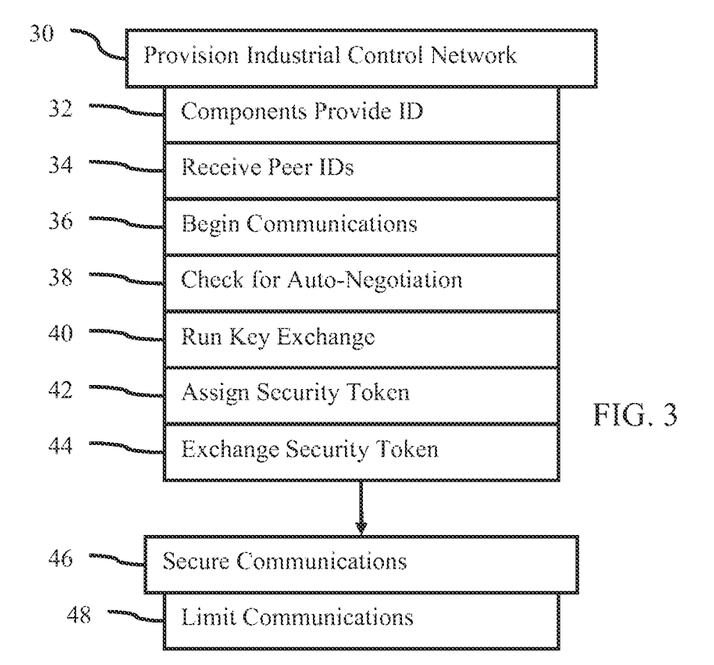
FIG. 3 is a flow chart diagram of one embodiment of a method for internal generation of secure network communications.

FIG. 3 shows a method for internal generation for secure network communications. The method is implemented by the system of FIG. 1, a component of FIG. 2, or another system and/or component. The acts are performed in the order shown or other orders. For example, acts 40 and 42 are performed at a same time as part of a same process. As another example, acts 48 and 46 are performed in any order or at a same time.

Additional, different, or fewer acts may be provided. For example, the acts of FIG. 3 focus on the operations of the field devices. Additional or different acts are provided for the engineering station 26, whether acting as a field device or as the centralized control. For example, acts for assigning peer groups and downloading programs are performed by the engineering station.

In act 30, the industrial control network is commissioned. The components are placed and connected. The networked components are powered on and any tests are performed to confirm operation of the components and the network. Any acts for provisioning the industrial control system are performed. The commissioning occurs in the known-good environment. The networked components are configured to operate without connection external to the industrial control system. Acts 32-44 are performed in the known-good environment. Once communications are secured, the network may be connected to other devices.

The commissioning includes acts to arrange for and to exchange security tokens for establishing secure communications. In other embodiments, the commissioning is completed, and the exchange of security tokens occurs after commissioning and before operation of the industrial control process.

Once in the known-good environment, the engineering station 26 begins an auto-negotiation process to establish secure communications without connection to a third party or other source outside the network. The engineering station 26 is configured to establish peers between the programmable logic controllers 20A-C, human machine interface devices 22, and operator stations 24 in the industrial control network. To establish peers, the identities are read from the field devices. Messaging may be used to obtain the identities. Because the engineering station 26 has access to all of the field devices on the network, the engineering station 26 retrieves the physical or logical identifiers from each of the field devices.

In act 32, the field devices provide identification. The field device has a physical identification. Alternatively, a logical identification is created during commissioning. The identifier is provided by messaging, transmission, or storage in a readable register. The identifier is unique to the field device, distinguishing each field device of the network from the other field devices.

Using the identifiers, the engineering station 26 configures the network for operation. An engineer programs the network using the engineering station 26. The programs or projects to be implemented by the various field devices are selected or created. The programs are for programming the programmable components, such as the programmable logic controllers 20A-C and/or the operator station 24. Other components (e.g., human-machine interface device 22) may have fixed programming and/or operate in a predetermined manner without programming from the engineering station 26.

Based on the design of the industrial control network and corresponding programming, components of the network are to communicate with some, but not all, of the other components. To operate, a given field device communicates with another field device, but not a different field device. In the aggregate throughout the network, peer groups are established. The components are arranged in the peer groups. This arrangement occurs in an insecure state or prior to exchanging security keys. The engineer assigns components to peer groups. Each peer group is a collection of components (i.e., peers) that communicate with each other. A given component may be in one or multiple peer groups.

The engineering station 26 communicates the peer identities to the field devices. The peer assignments are downloaded. Each field device is provided with the identities of any other field devices in the same peer group. The identities of just the components needed for communication are provided to each given component. Alternatively, the identities of components with which a given component is not to communicate is also provided for redundancy.

To establish secure communication, the communications may be limited to just peers. Further security is provided by encrypting the communications and/or verifying authenticity of peers.

In act 34, the identities of peers are received at each of the field devices. The peer identification is received with or separate from the programming. For example, the programming itself includes the peer identities for specific types of communication or functions. Alternatively, the identities are provided in a collection for specific use in negotiating secure communications.

Figure 4:
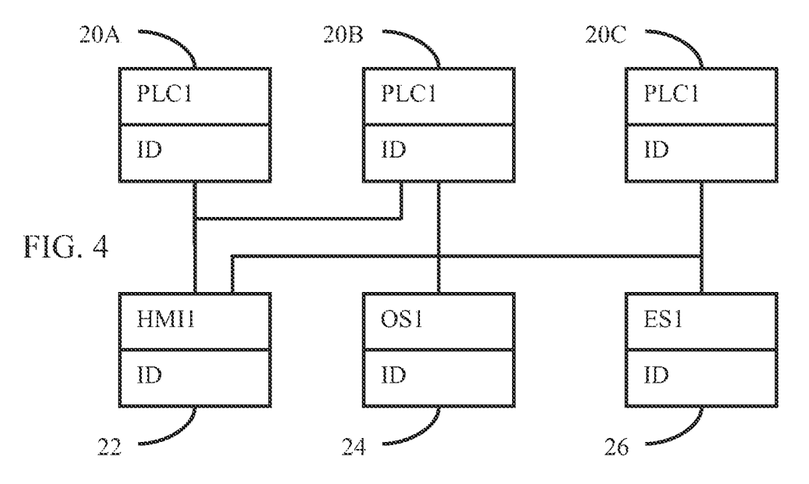
FIG. 4 is a block diagram of the system of FIG. 1 with assigned peers for internal generation of secure network communications.

FIG. 4 shows an example peer grouping in the industrial control network of FIG. 1. Three peer groups are used. A first group is of the engineering station 26, the programmable logic controller 20C, and the human-machine interface device 22. A second group is the two programmable logic controllers 20A and 20B and the human-machine interface device 22. A third group is the programmable logic controller 20B and the operator station 24. Other grouping may be used.

The engineering station 26 sends the identities of these peers to the peers. For example, the programming for the programmable logic controller 20A includes the identities (logical or physical) of the programmable logic controller 20B and the human-machine interface device 22. The programmable logic controller 20B receives the identities of the programmable logic controller 20A and the human-machine interface device 22 in one peer group and the operator station 24 in another peer group.

To secure communications, the operating system or firmware of the components includes instructions for authentication and/or encryption. The instructions are activated or performed when communications are to begin in act 36. Alternatively, the instructions are performed in a set-up or commissioning process prior to a need to communicate between peers.

In act 36, one or more of the components of the industrial control network determines that communication is to occur with a peer. In processing the programming, such as for a test run, the communication is called for by the programming. The communication is a first call for the peer or for the peer group. The beginning of communications triggers establishing secure communications. Rather than or in addition to performing the communication, the call for communication triggers automatic negotiation of security for communications.

In act 38, the component needing to communicate checks for automatic negotiation of security. In one embodiment, the component needing to communicate with a peer first checks a flag in memory to determine if automatically negotiated security is to be used. If not, then the communication is enabled without further security or other security provisioning is performed.

The component configured for automated negotiation checks the peers to determine compatibility. If security is to be automatically negotiated, the component messages the peers. The message requests a response indicating whether the peers are configured for automatic negotiation.

Older devices may not be configured for automatic negotiation, so a different process to secure communications is performed or the communications proceed without further security. In alternative embodiments, communications with one or more components are not secured and communications with other components is secured. The communication with the non-supporting component is not further secured, but all other communications are secured; or communications within the peer group with the non-supporting component are not secured, but communications in other peer groups are secured.

If the component sending the message receives a message from a peer requesting whether the component is configured for automated negotiation, two peers may be performing the process at a same time. The message is received prior to completion of the automatic negotiation. If the message from the peer is received prior to sending the same type of message from the component, the component does not send the message and lets the other peer lead the automatic negotiation. If the message was already sent, then both the component and the peer have sent the same message. Both components stop automatically negotiating and begin random or predetermined timeouts of different lengths. When the timeout expires, the process is attempted again. Since the timeouts are of different lengths, a conflict is not likely to occur. Once the security is automatically negotiated within a peer group, further negotiation is not performed unless triggered by the engineering station or some other event.

In response to receiving the message, the peers communicate their configuration regarding automatic negotiation of security. For example, each peer checks the flag and indicates a capability to participate in the automated negotiation. The peers respond to the message. The response is provided to the requesting component, but may be provided to other peers as well. In alternative embodiments, the lead component reads compatibility without messaging, is provided compatibility from the engineering station without messaging, or assumes compatibility.

The requesting or lead component receives responses from the peers. When a positive response is received, the automated negotiation continues to secure the communications. The communications are secured using auto-negotiation when all or some of the peers have the automatic negotiated security capability.

In act 40, a key-exchange algorithm is run. The component leading the automatic negotiation runs the algorithm. Once the lead component is determined, the lead component enumerates through the peers in the corresponding peer group and uses a key-exchange algorithm to assign a security token in act 42 to each peer and to exchange the security tokens with the corresponding peers in act 44. To the extent the algorithm relies on actions by the peers, the peers run the appropriate algorithm as well. For example, the peers may generate keys as well for implementing two-way communications in a public-private key arrangement.

Any key-exchange algorithm may be used. HTTPS, IPSEC, SSL, PKI or other cryptographic method may be used. For example, the algorithm randomly generates key pairs. One private key is kept by the component and the other public key is sent to the peer. Each peer receives a key for encrypting messages and/or digital signatures. The keys are the security tokens. Symmetric or asymmetric (e.g., RSA) key algorithms may be used. In another example, a stateful connection is negotiated using a handshaking procedure. The lead component sends a digital certificate to the peers. The peers may or may not likewise send digital certificates to the lead component. The certificates may be used to generate shared secrets between the lead component and each peer for later authentication and/or encryption. The shared secret and/or the certificates are security tokens. In yet another example, the engineering station acts as an authentication server in a PKI system. As another example, preloaded and negotiated keys are used and the exchange algorithm confirms operability using the preloaded keys.

In act 42, the keys are assigned to the peers. Any security token may be used. The key-exchange algorithm outputs security tokens for each of the peers. Alternatively, the security tokens are assigned by acknowledging a token already stored on the peer. For example, the peer provides security token information in response to messaging from the lead component of the peer group.

The security tokens are generated or assigned without access outside of the industrial control network. The members of the peer groups are configured to assign security tokens to the peers of the peer groups without a validation authority or third party verification service. Since the network is not connected to other networks and/or is being commissioned in a known-good environment, the key exchange may be implemented assuming the components of the network, at least originally, are to be trusted. The security tokes are provided or generated from within the industrial control network by components (e.g., peers or engineering station) of the network. Without download of the encryption keys to the industrial control system during or after commissioning, the encryption keys are exchanged between the components in the known-good environment. The security tokens are assigned free of communications with the Internet or an intranet other than the industrial control network.

The security tokens are assigned by generating encryption keys, digital certificates, and/or shared secrets within the network. For example, the engineering station randomly generates the security tokens upon request or automatically. The security tokens are transmitted to the lead component and/or the peers. The security tokens may be generated and sent with the programming or after the programming. In other embodiments, the security tokens are randomly generated at the components, such as by the lead component and/or by peers. Key derivation functions may be used rather than random generation.

In alternative embodiments, the security tokens are pre-stored on the components. For example, a manufacturer pre-installs the security tokens on the components to be used together in a same network. Rather than generating the keys, the security tokens are assigned by loading from storage.

In act 44, the security tokens are exchanged. The digital certificates, public key, shared secret, or other information is provided from one peer to another. The exchange may be one way, broadcast, or two way. For example, any peers within a peer group that may or do communicate with each other exchange security tokens with each other. For one-way communications, the exchange may be from one peer to the other, but not the reverse. Some key exchanges (e.g., symmetric) may allow two-way secure communications with a one-way exchange. The security tokens are transmitted between peers or from one peer to another peer. The exchange occurs in the known-good environment.

Components not in a peer group with a given component do not exchange security token information with the given component. As a result, the key, shared secret, or certificate for authentication and/or encryption is not available for secure communications from the given component to the components of outside peer groups. The peer groups are exclusive. Communications outside the peer groups is restricted or not allowed.

Once peers in a peer group are assigned security tokens, the automatic negotiation is complete. Verification of operation may be performed. New members may not be added to the peer group without reprogramming by the engineering station 26.

In act 46, the security tokens are used for securing communications. The communications between peers or from one peer to another are secured based on the security tokens. As the component operates pursuant to the programming, messages (e.g., requests, responses, broadcasts, transmissions) are generated. The messages are provided using secure communications.

In one embodiment, the messages themselves are encrypted. The security token is used to encrypt or encipher. This allows the receiving peer to decrypt or decipher the message with the exchanged security token.

In an alternative or additional embodiment, the security tokens are used for authentication. Digital identities are generated based on the security tokens. The messages are signed with the unique digital identity. The security token is used to authenticate the source of a received message.

In act 48, communications without use of the security key are limited. Using either authentication and/or encryption, the messages are verified. If messages do not use the security key information, the message is discarded, ignored, or forwarded (e.g., flagged for investigation). The component may not act upon the message other than in this limited manner. To provide security, communications with a networked component not in the peer group are not allowed. If the component is not authenticated or the message cannot be decrypted, the communications is not allowed.

Communications with the engineering computer may require security tokens (e.g., engineering station 26 included in every peer group) or may operate outside of the secure communications channels. The engineering station 26 may reprogram the components of a peer group in order to re-negotiate the security for adding a component. The trust for the added component is initially assumed based on the representation from the engineering station. The trust of the peer group is based on the previously negotiated security. A newly negotiated security (e.g., new generation and exchange of security tokens) may be performed to add the component.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for internal generation for secure network communications, the method comprising:
commissioning an industrial control system comprising in a known-good environment, a plurality of networked components and an engineering station, each including at least one processor, wherein the networked components include at least one programmable logical controller (PLC), at least one human machine interface device, and at least one operator station;
through operation of the at least one processor of the engineering station: reading identifiers from the at least one programmable logic controller, the at least one human machine interface device, and the at least one operator station, and communicating to the networked components operation programs and respective peer assignments including identifiers for peers in a peer group, wherein each peer assignment respectively specifies for each networked component which of the other networked components are peers thereof in the peer group, wherein at least one peer group includes at least three networked components; and through operation of the processors of the networked components based on the peer assignments:

exchanging encryption keys between the networked components in each respective peer group in the known-good environment without download of the encryption keys to the commissioned industrial control system; and securing communications between the networked components in each respective peer group with the encryption keys;

wherein internal generation of the encryption keys ensures that communication is restricted to only trusted components of the respective peer groups within the industrial control system.

2. The method of claim 1 wherein commissioning in a known-good environment comprises initially operating the networked components without an external connection to the industrial control system.

3. The method of claim 1 wherein commissioning comprises networking together the networked components.

4. The method of claim 1, further comprising in generating the encryption keys at an engineering station and transmitting the encryption keys to other of the networked components.

5. The method of claim 1, further comprising randomly generating the encryption keys at the networked components and transmitting the encryption keys to peers of the networked components based on the peer assignments.

6. The method of claim 1 wherein at least two peer groups are comprised of different sets of networked components that include at least one common networked component.

7. The method of claim 1 wherein exchanging comprises:
a first one of the networked components communicating with peers thereof;
checking, by the first one of the networked components, for automatic negotiated security capability of the peers; and
exchanging with the peers when all of peers have the automatic negotiated security capability.

8. The method of claim 7 wherein exchanging comprises messaging to the peers that the first networked component leads the exchanging.

9. The method of claim 1 wherein securing communications comprises enciphering with the encryption keys.

10. The method of claim 1 wherein securing communications comprises generating digital identities as a function of the encryption keys.

11. The method of claim 1 wherein exchanging comprises exchanging with the networked components free of communications with an intranet or an Internet.

12. The method of claim 1 further comprising disallowing an additional networked component for the secure communications without reprogramming by the engineering station.

13. A system for internal generation of secure network communications, the system comprising:
an industrial control network comprising a plurality of networked components including one or more human machine interface devices, one or more programmable logic controllers (PLCs), and one or more operator stations, each including at least one processor;

an engineering station including at least one processor configured to establish peers between the one or more programmable logic controllers, the one or more human machine interface devices, and the one or more operator stations in an industrial control network, by communicating respective peer assignments to the network components that specify which of the network components are peers of each other in peer groups, wherein at least one of the peer groups includes at least three networked components;

wherein members of the network components in each peer group are configured to assign security tokens to each other, to communicate between each other based on the security tokens, and to limit communication outside of the peer groups based on the security tokens;

wherein the at least one processor of the engineering station is configured to:
read identifiers from the one or more programmable logic controllers, one or more human machine interface devices, and one or more operator stations; and
download operation programs to the one or more programmable logic controllers, one or more human machine interface devices, and one or more operator stations, with the peer assignments including the identifiers for the peers in each peer group;

wherein internal generation of the encryption keys ensures that communication is restricted to only trusted components of the respective peer groups within the industrial control system.

14. The system of claim 13 wherein the establishing and assigning occur prior to any connection of the industrial control network to another network and wherein the members being configured to assign comprises being configured to provide the security tokens from within the industrial control network.

15. The system of claim 13 wherein the at least one processor of each of the members is configured:
determine that a communication with one of the peers in one of the peer groups is to be performed by a first one of the peers in a first one of the peer groups;
check, by the first peer, the peers of the first peer group for auto-negotiated security capability;
message, by the first peer, the peers of the first peer group of a leadership role in auto-negotiated security when all of the peers of the peer group have the auto-negotiated security capability; and
assign, by the first peer, the security tokens to the peers of the peer group.

16. The system of claim 13 wherein the members are configured to sign messages using a security token, encrypt messages using a security token, or both.

17. In a non-transitory computer readable storage medium having stored therein data representing instructions executable by a programmed processor of a networked component for internal generation of secure network communications, which cause the networked component to carry out a method comprising:
providing an identifier of the networked component to an engineering station of an industrial control network;
receiving from the engineering station an operation program, and a peer assignment including identifiers that identify a plurality of peers for a peer group of other network components in the industrial control network that include at least one programmable logic controller (PLC), at least one human machine interface device, and at least one operator station;

running a key-exchange algorithm without access outside of the industrial control network with the peers of the peer group based on the peer assignment;
assigning security tokens to the peers of the peer group as an output of the key-exchange algorithm; and
communicating with the peers of the peer group pursuant to the project as a function of the security tokens;
wherein internal generation of the encryption keys ensures that communication is restricted to only trusted components of the respective peer groups within the industrial control system.

18. The non-transitory computer readable storage medium of claim 17 wherein providing, receiving, running and assigning are performed as part of commissioning the industrial control network while in a known-good environment, and wherein communicating comprises limiting the communications to the of the peer group.

* * * * *